June 30, 1953　　　A. G. KUEBLER ET AL　　　2,643,956
COATING METHOD AND APPARATUS FOR LUMINESCENT TUBES
Filed March 1, 1950
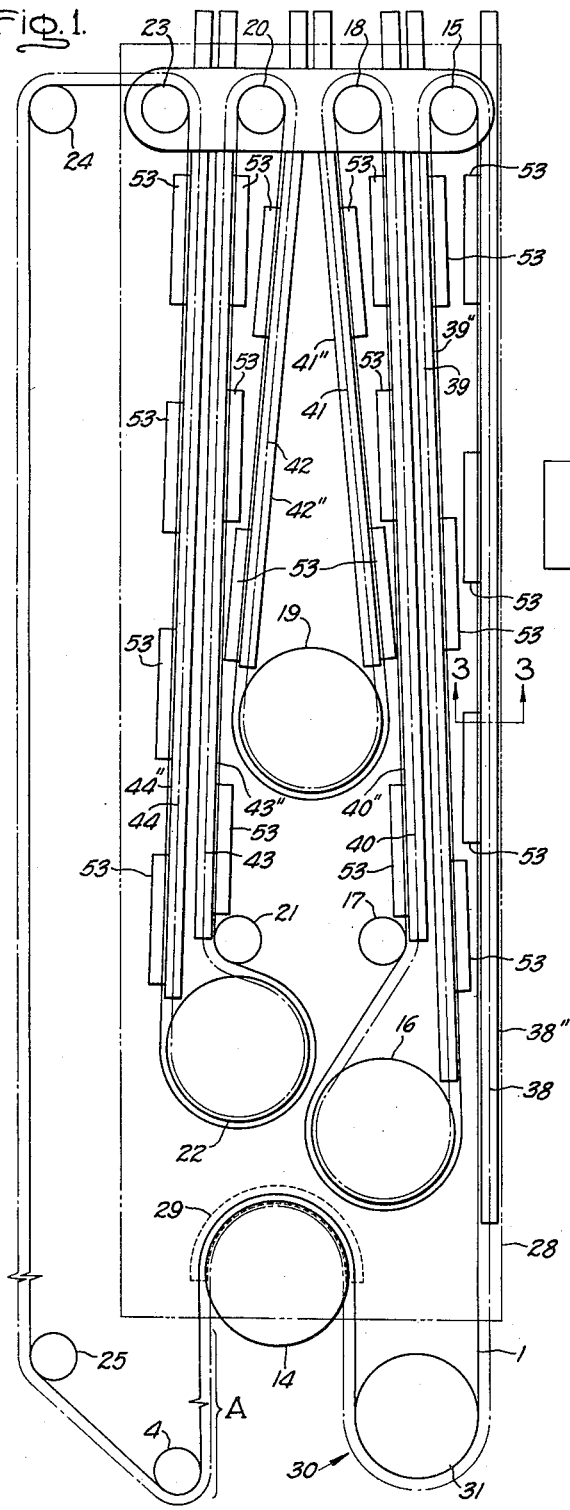
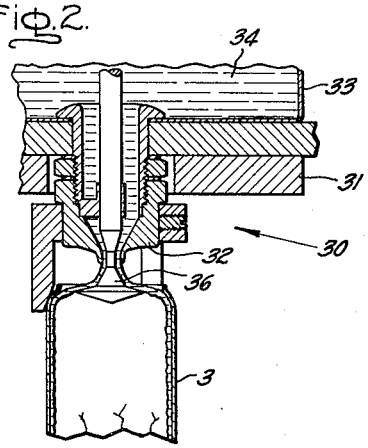
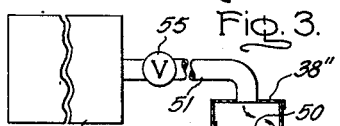
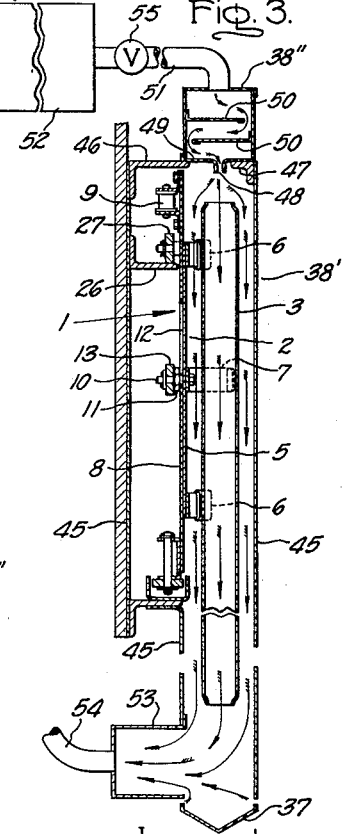
Inventors:
Arthur G. Kuebler,
John B. Hollopetre,
by Vernet C. Kauffman
Their Attorney.

Patented June 30, 1953

2,643,956

UNITED STATES PATENT OFFICE 2,643,956

COATING METHOD AND APPARATUS FOR LUMINESCENT TUBES

Arthur G. Kuebler and John B. Hollopetre, South Euclid, Ohio, assignors to General Electric Company, a corporation of New York Application March 1, 1950, Serial No. 146,962

8 Claims. (Cl. 117—33.5)

1

Our invention relates, in general, to method and apparatus for applying a coating of powdered material on a wall of an open-ended glass tube and particularly to the interior wall of such a tube. The invention is especially useful for the production of fluorescent coatings on the interior wall of fluorescent lamp tubes.

In the manufacture of tubular fluorescent lamps, the formation of a uniform smooth coating of fluorescent material on the inner wall of the lamp envelope has been a desirable object but a difficult problem. Dark streaks, wood grain-like patterns, blotches, and spotty areas are some of the conditions which are difficult to avoid and which not only detract from the appearance of the coated tube but also interfere with the production of a uniform quality product.

It is an object, therefore, of our invention to provide an improved method of applying a coating of powdered luminescent material to the walls of elongated glass tubes whereby the above-mentioned difficulties are overcome.

Another object of our invention is to provide a method of applying to the inner walls of an elongated glass tube or lamp envelope a uniform smooth coating of luminescent material which is free from dark spots, streaks, and the like.

Still another object of our invention is to provide a method of applying a coating of luminescent material to the inner walls of elongated glass tubes which will materially decrease the time required to dry the coating and which will at the same time result in the formation of a uniform coating free from dark spots, streaks, and the like.

A further object of our invention is to provide apparatus for applying a uniform coating of luminescent material to the walls of elongated glass tubes.

A still further object of our invention is to provide apparatus for rapidly drying a coating of a luminescent material suspension on the inner wall of a glass tube in a manner whereby a uniform coating of the luminescent material is obtained.

Another object of our invention is to provide apparatus for applying a coating of powdered luminescent material to the inner wall of an elongated glass tube, which apparatus provides accurate control over those conditions which govern the uniformity of the final coating, thereby enabling the production of uniform coatings free from dark spots, streaks, and the like.

In accordance with the invention, elongated glass tubes such as are used for the envelopes of tubular fluorescent lamps are provided with uniform coatings of powdered fluorescent material on their inner walls by applying onto the said inner wall a layer of a suspension of the powdered luminescent material in a liquid suspension medium or lacquer solution comprising readily vaporizable solvents, and then positioning the coated tube vertically and directing therethrough as well as along its outer side a stream of heated air moving substantially in a vertically down direction only parallel to the vertically positioned tube whereby the coating on the tube wall is progressively dried downward from the top of the tube and uniformly therearound.

Further objects and advantages of our invention will appear from the following detailed description of a species thereof and from the accompanying drawing in which:

Fig. 1 is a diagrammatic plan view of a coating apparatus according to the invention; Fig. 2 is a fragmentary vertical section of the apparatus showing the coating applicator means; and Fig. 3 is a fragmentary vertical sectional view through the drying chamber of the apparatus.

In general, in the coating of open-ended glass tubes with powdered luminescent material in accordance with the invention, the tube wall is first coated with a suspension of the powdered luminescent material in a liquid suspension medium comprising a readily vaporizable solvent, after which the tube is supported in a vertical position on a conveyor which carries it in such vertical position through a narrow drying chamberway or tunnel in which a vertical down draft of heated air is present, the heated air passing through as well as along the outer side of the tube throughout its full length so as to heat and dry the coating progressively downward from the top of and uniformly around the tube.

Referring to the drawing, the tube coating apparatus there shown is of the general downflush type described and claimed in U. S. Patent 2,415,512, Malloy, dated February 11, 1947, and assigned to the same assignee as the present application, and comprises an endless belt-type conveyor 1 having a plurality of heads 2 into which the elongated glass tubes or lamp envelopes 3 to be coated are loaded along the portion A of the course of travel of the conveyor from a sprocket 4. The heads 2 each comprise a vertically disposed channel-shaped slide 5 provided with tube-holding means comprising a pair of vertically spaced V-notched back supports or rests 6 against which the tubes 3 are spring held, to vertically position the same, by a Phosphor bronze spring clip 7 mounted on the slide intermediate the back supports 6. The channel slide 5 is vertically reciprocable on a vertically extending support bar or slat 8 which is attached adjacent its upper end to a conveyor chain 9 and is carried thereby. The support bar 8 is received within the channelway of the slide 5, the sides of the latter serving as ways between which the support bar 8 rides to guide the slide in its vertical sliding movement on the support bar. The slide 5 is slidably held in place on the support bar 8 by a bolt 10 and nut 11, the bolt 10 projecting from the back side of the slide through a vertical slot 12 in the support bar, through which slot the bolt moves during the vertical movement of the slide relative to the support bar. The bolt 10 is provided with a stud end on which is mounted a cam roller 13 for engaging with a cam track to raise or lower the slide 5. In its lowered position, as shown in Fig. 3, the slide 5 is supported by the engagement of the bolt 10 with the lower end of the slot 12 in the support bar 8.

The heads 2 are mounted in closely spaced, regular intervals along the conveyor chain 9 which carries them from the sprocket 4 around the full length of the conveyor and back to the said sprocket. During its travel around the machine, the conveyor 1 is supported by the sprocket 4 and various other sprockets and pulleys 14–25, inclusive, as well as by intervening support rails (one of which is shown at 26 in Fig. 3) on which ride rollers 27 mounted on the back side of the head support bars 8.

From the portion A of the path of travel of the conveyor where the tubes 3 are loaded into the conveyor heads 2, the tubes are carried by the conveyor into a large enclosure or chamber 28 where they are preliminarily heated to more or less uniform temperature throughout their length preparatory to the application of the coating thereto. For this purpose an arcuate preheating chamberway 29 is provided within the enclosure 28 through which the tubes 3 are carried and through which heated air from a manifold (not shown) is circulated from top to bottom thereof. The chamberway 29 is concentric with the pulley wheel or drum 14 located within the enclosure 28 and around which the conveyor 1 runs to carry the heads 2 and the associated tubes 3 through the said preheating chamberway 29.

From the preheating chamberway 29 the tubes 3 are carried by the conveyor 1 back out of the enclosure 28 and around a turret-type coating apparatus 30 where they are coated internally with a suspension of powdered luminescent or fluorescent material in a suitable liquid suspension medium comprising a lacquer binder, for instance a cellulosic lacquer such as nitrocellulose, dissolved in one or more readily vaporizable solvents such as butyl acetate and naphtha, for example. The coating apparatus 30 is similar to that described and claimed in the aforementioned Malloy Patent 2,415,512 and comprises, in brief, a turret 31 partly around which the conveyor 1 carries the tubes 3 in vertically aligned relation with overlying coating nozzles 32 on the turret. The coating nozzles 32 are located in the bottom of a header tank 33 containing a reservoir 34 of the coating suspension to be applied to the tubes 3. During the course of movement of the tubes around the turret 31 along with the nozzles 32, the cam roller 13 on each head slide 5 engages with and rides up an inclined cam track (not shown) to thereby move the slide 5 and the tube carried thereby upwardly so as to position the open upper end of the tube immediately beneath the aligned coating nozzle 32, whereupon a valve or metering pin 36 in the coating nozzle 32 is moved downwardly, by suitable mechanism such as shown in the above Malloy patent, into the open upper end of the tube to thereby open the valve and discharge a predetermined amount of the coating suspension into the tube and direct it onto the upper end of its inner wall whence it flows down along the length of the tube and coats the entire inner surface thereof, the excess draining out the open lower end of the tube into a V-shaped drip pan or collecting trough 37 (Fig. 3) and being pumped back into the header tank 33 for reuse. For a further and more complete description of the construction and operation of the coating apparatus 30, reference may be had to the aforesaid Malloy Patent 2,415,512.

From the coating apparatus 30 the conveyor 1 advances the heads 2 and associated tubes 3 back into the enclosure 28 where the tubes are carried back and forth in more or less side-by-side paths 38–44 therein (as indicated by the dash-dot lines in Fig. 1) during which time the interior coating on the tubes is dried. The enclosure or main chamber 28 may be composed, in general, of a framework made of suitable structural iron members, such as angles, channels and the like, covered over by suitable sheet metal panels, as by galvanized iron sheets, for instance.

In accordance with the invention, the conveyor 1 and the associated tubes 3, during their travel along the paths 38–44, pass through corresponding narrow chamberways or tunnels 38'–44' (only one of which is shown) which are provided within the enclosure 28 and extend substantially throughout the full length of the respective paths 38–44. As shown in Fig. 3, each of the said chamberways 38'–44' extends vertically the full length of the tubes 3 as well as above and below the ends thereof so as to substantially enclose the tubes. The said chamberways may be formed in part by vertical sheet metal side panels or walls 45 fastened to horizontally extending angle iron supports, such as indicated at 46 and 47 for instance, mounted on the framework of the main enclosure 28.

During their travel through the respective chamberways 38'–44', the coated tubes 3 are subjected to controlled heating in order to dry the coating thereon progressively down from the top of and uniformly around the tubes so as to obtain uniform coatings free from dark spots, streaks, and the like. For this purpose, a curtain or down draft of heated air is directed vertically downward through the chamberways in a manner such as to cause passage of the heated air not only down through the tubes 3 but in a straight line downwardly parallel to and along the full length of the outer sides of the tubes as well while maintaining the velocity of the air adjacent the outer sides of the tubes at a substantially constant value throughout the lengths of the tubes. This maintains equal drying conditions both inside and outside the tube and gives a better and faster drying of the internal coating than with previous methods. The heated air passing down along both the inner and outer sides of each tube 3 heats it to progressively decreasing temperatures from top to bottom and to substantially uniform temperature around the tube, both inside and out, as a result of which the coating, in addition to being progressively dried from the top of the tube down to the bottom thereof, is also dried evenly around the circumference of the tube. Such uniform progressive drying of the tubes from the top down therefore results in the production of uniform coatings free from dark spots, streaks, and the like.

The heated air is directed downwardly through the chamberways 38'-44' instead of upwardly for the reason that with the usual coating suspensions employed in fluorescent lamp manufacture the vapors liberated upon drying of the coating are heavier than air and therefore pass downwardly through the tubes 3 so as to produce a downward chimney effect or air flow in the tubes. Consequently, the heated air is passed through the tubes 3 in the same direction, i. e., downwardly, as the natural flow of the vapors therein during drying of the tube coating in order to assist and accelerate, rather than retard, the removal of the coating vapors from the tubes. Furthermore, because of the downward drainage of the coating suspension in the vertically positioned tubes 3, the natural tendency of the tube coating is to dry progressively from the top of the tube down to the bottom thereof. Downward passage, therefore, of heated air through the coated tubes likewise tends to dry the coating from the top down. Moreover, in the drying of the coated tubes 3 while positioned vertically, it is essential to the attainment of an even or uniform coating that the coating be dried from the top of the tubes down to the bottom since with drying of the coating from the bottom up the still fluid portion of the coating above the dried portion of the coating at the lower region of the tube would tend to flow downwardly over and overlap such dried coating portion and thus form cascade-like thickenings in the final coating.

The heated air is introduced into the various chamberways 38'-44' at the top thereof through longitudinally extending slots or slit-like passageways 48 in their respective top walls 49. The said passageways 48 extend parallel to and substantially throughout the full length of the various paths of travel 38-44 of the tubes 3, and they are located directly above (around 1 inch or so above) and in alignment with the open upper ends of the tubes during the travel thereof so as to continuously direct the heated air downwardly into and through the tubes as well as downwardly between and along the outer sides of the tubes (as indicated by the arrows in Fig. 3) at all times during their travel along the path of movement 38-44. The heated air is supplied to the inlet passageways 48 of the various chamberways 38'-44' by respective overhead hot air duct manifolds 38''-44'' the bottom walls 49 of which are supported on the chamberway support angles 46-47 and form the top walls of the respective chamberways 38'-44'. The duct manifolds 38''-44'' are provided with pressure-equalizing baffles 50 and they are connected by ducts 51 to a main or common hot air manifold 52 into which heater air, at the desired temperature and pressure, is introduced from a suitable source (not shown) such as, for instance, a motor-driven air blower unit provided with electric heating elements for heating the air to the desired temperature.

In order to assure a substantially vertical straight line downward flow or down draft of heated air in the respective chamberways 38'-44' extending downward throughout substantially their full vertical extent, the said chamberways are each provided at their bottoms with a plurality of exhaust duct manifolds 53 spaced apart along the length of the respective chamberways and connected by ducts 54 to a suitable exhausting means (not shown) such as a motor-driven exhaust fan for instance. As shown, the exhaust duct manifolds 53 communicate with the interior of the chamberways 38'-44' at points an appreciable distance (12 inches or so) below the open lower ends of the tubes 3 passing therethrough so as to withdraw the heated air from the chamberway at a region below the lower ends of the tubes, thereby assuring flow of the heated air in a substantially straight vertical line downwardly past and below the said lower ends of the tubes. While in the particular apparatus illustrated a plurality of exhaust dust manifolds 53 are shown spaced along the length of each path 38-44 of the tubes 3, it is preferable to employ just one continuous exhaust dust manifold 53 extending substantially the full length of each chamberways 38'-44' whereby to more effectively secure withdrawal of the heated air from the lower regions of the chamberways in substantially straight-line vertically downward paths at all points throughout the lengths of the respective chamberways.

As the drying of the coated tubes progresses during their travel through the several chamberways, and particularly during the latter stages of the drying cycle when the coating has been dried sufficiently so as to adhere to the tube wall and be fixed in place thereon against any further displacement, the rate of drying of the tube coating is increased, slowly at first aand then more rapidly toward the end of the drying cycle, in order to shorten the total required drying time. This may be accomplished either by additionally heating, or by increasing the rate of flow, or both, of the heated air introduced into the top of those chamberways or chamberway portions in which the increased rate of drying is desired. The additional heating of the air may be effected by means of supplementary electric heating elements (not shown) located in the individual overhead duct manifolds 38''-44'', or in the supply ducts 51 therefor, while the rate of flow of the heated air into the chamberways 38'-44' may be controlled to give an increased or decreased rate of air flow, as desired, by means of butterfly valves 55 located in the supply ducts 51 for the overhead hot air duct manifolds 38''-44''. In the particular case illustrated, wherein glass tubes 3 of one and one-half inch diameter and four foot length are internally coated with fluorescent material, the rate of flow and temperature of the heated air introduced into the various chamberways 38'-44' are both increased, at a gradually increasing rate, from a very gentle air flow rate (for instance, less than 100 cubic feet per minute) just enough to pull the vapors out of the tube and a relatively low temperature just above room temperature (i. e., from 70° to 80° F.) during the first pass or run 38 of the tubes through the drying chamber 28, to an air flow rate of the order of 1000 to 1200 cubic feet per minute anad a temperature of around 140 to 160° F. during the last pass or run 44 of the tubes through the drying chamber.

With the channel drying arrangement according to the invention, the use of heated air flowing in a substantially straight line vertically downward through the chamberways, so as to flow substantially parallel to the coated tubes 3 passing therethrough, is an important aspect of the invention since it avoids the presence of crosscurrents of air transversely of the tubes such as cause uneven drying of the internal coating of the tubes with resultant serious coating defects such as dark spots, streaks, and the like. Moreover, the arrangement according to the invention permits ready and accurate control over those conditions (i. e., the temperature and rate of flow of the heated air and the time of exposure of the tubes to the heated air) which govern the drying of the coating so that it is possible to obtain the best coating quality in any given case. Also, the method according to the invention effects a material reduction in the drying time of the fluorescent coating on the tubes 3.

Although a preferred embodiment of our invention has been disclosed, it will be understood that the invention is not to be limited to the specific construction and arrangement of parts shown, but that they may be widely modified within the spirit and scope of our invention as defined by the appended claims.

What we claim as new and desire to secure by Letters Patent of the United States is:

1. The method of forming a coating of powdered luminescent material on one of the walls of an elongated glass tube having both ends open which method comprises, depositing on the said one wall of the tube a coating of a suspension of the luminescent material in a liquid suspension medium comprising a readily vaporizable solvent, positioning the coated tube in a vertically extending position in a narrow confined space at least co-extensive with said tube to drain the excess coating suspension from the tube, and then simultaneously passing a stream of heated air downwardly through the vertically positioned tube and downwardly along and parallel to its outer side through said confined space while maintaining the velocity of the said heated air adjacent the outer side of the tube at a substantially constant velocity throughout the length of the tube so as to contact the outer surface of the tube along substantially its full length and completely therearound to thereby dry the coating on the tube.

2. The method of forming a coating of powdered luminescent material on the interior surface of an elongated glass tube having both ends open which method comprises, depositing on the interior surface of the tube a coating of a suspension of the luminescent material in a liquid suspension medium comprising a readily vaporizable solvent, positioning the coated tube in a vertically extending position in a narrow confined space at least co-extensive with said tube to drain the excess coating suspension from the tube, and then simultaneously passing a stream of heated air downwardly through the vertically positioned tube and downwardly along and parallel to its outer side through said confined space while maintaining the velocity of the said heated air adjacent the outer side of the tube at a substantially constant velocity throughout the lengh of the tube so as to contact the outer surface of the tube along substantially its full length and completely therearound to thereby dry the coating on the tube.

3. The method of forming a coating of powdered luminescent material on the interior surface of an elongated glass tube having both ends open which method comprises, depositing on the interior surface of the tube a coating of a suspension of the luminescent material in a liquid suspension medium comprising a readily vaporizable solvent, positioning the coated tube in a vertically extending position in a narrow confined space at least co-extensive with said tube to drain the excess coating suspension from the tube, and then simultaneously passing a stream of heated air downwardly through the vertically positioned tube and downwardly along and parallel to its outer side through said confined space while maintaining the velocity of the said heated air adjacent the outer side of the tube at a substantially constant velocity throughout the length of the tube so as to contact the outer surface of the tube along substantially its full length and completely therearound to heat the tube to progressively decreasing temperature from the top down and to substantially uniform temperature therearound both inside and out.

4. The method of forming a coating of powdered luminescent material on the interior surface of an elongated glass tube having both ends open which method comprises, positioning the tube in a vertically extending position, flowing onto the upper end of the inner surface of the tube a suspension of the luminescent material in a liquid suspension medium comprising a readily vaporizable solvent to deposit a coating of said suspension on the said inner surface, and then bodily transporting the vertically positioned coated tube transversely through a narrow confined space at least coextensive with the tube and simultaneously creating a curtain of vertically downward flowing heated air in said confined space to effect passage of said heated air downwardly through said tube, and downwardly along and parallel to its outer side while maintaining the velocity of the said heated air adjacent the outer side of the tube at a substantially constant velocity throughout the length of the tube so as to contact the outer surface of the tube along substantially its full length and completely therearound, whereby to dry the said coating on the tube.

5. The method of forming a coating of powdered luminescent material on the interior surface of an elongated glass tube having both ends open which method comprises positioning the tube in a vertically extending position, depositing on the interior surface of the vertically positioned tube a coating of a suspension of the luminescent material in a liquid suspension medium comprising a readily vaporizable solvent, confining the coated tube in a vertical position within a narrow confined space at least co-extensive with said tube, and then simultaneously passing a stream of heated air downwardly through the vertically positioned coated tube and downwardly along and parallel to its outer side through said confined space while maintaining the velocity of the said heated air adjacent the outer side of the tube at a substantially constant velocity throughout the length of the tube so as to contact the outer surface of the tube along substantially its full length and completely therearound, to heat the tube to progressively decreasing temperature from the top down and to substantially uniform temperature therearound both inside and out.

6. Apparatus for drying a coating of a powdered luminescent material suspension on the inner wall of a glass tube open at both ends comprising a carrier for supporting a succession of the coated tubes in a vertical position and advancing the tubes along a fixed path of travel, a series of elongated narrow chamberways extending along the path of travel of and through which the vertically extending coated tubes are successively advanced by the carrier, said chamberways closely confining and substantially enclosing the coated tubes during their travel therethrough, and means for producing in said chamberways, substantially throughout their lengths, a substantially vertical down draft of heated air flowing at controlled rates downwardly through as well as along the outer side of the coated tubes within said chamberways so as to contact the outer surface of the tubes along substantially their full length and completely therearound, said means comprising separate manifolds corresponding to and overlying and extending along respective chamberways and communicating with the interior thereof through substantially continuous slit-like passageways formed in the upper wall of the chamberways and closely overlying and substantially aligned with the open upper ends of the coated tubes during their travel through the chamberways, a separate supply duct for each manifold and in communication therewith, a source of heated air connected to the said supply ducts, and control means located in each of said ducts for regulating the rate of flow of the heated air therethrough and into the respective manifolds.

7. The method set forth in claim 2 wherein the rate of flow and the temperature of the heated air are increased at a progressively increasing rate during the continuance of the drying operation.

8. The method set forth in claim 2 wherein the rate of flow and the temperature of the heated air are increased at a progressively increasing rate from a gentle air flow rate and an air temperature of the order of 70–80° F. during the first part of the drying operation to an appreciable air flow rate and an air temperature of the order of 140–160° F. during the last part of the drying operation.

ARTHUR G. KUEBLER.
JOHN B. HOLLOPETRE.

References Cited in the file of this patent

UNITED STATES PATENTS

| Number | Name | Date |
|---|---|---|
| 1,511,835 | Mueller | Oct. 14, 1924 |
| 2,287,024 | Casellini | June 23, 1942 |
| 2,317,977 | Casellini | May 4, 1943 |
| 2,318,060 | Cortese | May 4, 1943 |
| 2,337,740 | Albright | Dec. 28, 1943 |
| 2,415,512 | Malloy | Feb. 11, 1947 |

FOREIGN PATENTS

| Number | Country | Date |
|---|---|---|
| 586,643 | Great Britain | Mar. 26, 1947 |